United States Patent
Ahn et al.

(10) Patent No.: US 6,840,536 B2
(45) Date of Patent: Jan. 11, 2005

(54) PASSENGER AIR BAG ASSEMBLY WITHOUT DOOR ATTACHMENT BRACKET FOR AUTOMOBILE

(75) Inventors: Jung-Bae Ahn, Kyunggi-do (KR); Jung-Soo Lee, Kyunggi-do (KR); Joon-Ho Kim, Seoul (KR); Ik-Hwan Kim, Chungcheongnam-do (KR); Byong-Ryong Cho, Kyunggi-do (KR); Gun-Woo Kim, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 0 days.

(21) Appl. No.: 10/330,199

(22) Filed: Dec. 30, 2002

(65) Prior Publication Data

US 2003/0230874 A1 Dec. 18, 2003

(30) Foreign Application Priority Data

Jun. 12, 2002 (KR) .................................. 10-2002-0033042

(51) Int. Cl.[7] .............................................. B60R 21/20
(52) U.S. Cl. ...................................... 280/728.2; 280/732
(58) Field of Search ........................... 280/728.2, 728.3, 280/731, 732

(56) References Cited

U.S. PATENT DOCUMENTS

| | | | | | |
|---|---|---|---|---|---|
| 5,280,946 | A | * | 1/1994 | Adams et al. ............ | 280/728.2 |
| 5,303,951 | A | * | 4/1994 | Goestenkors et al. .... | 280/728.3 |
| 5,794,967 | A | * | 8/1998 | Manire .................... | 280/728.3 |
| 6,199,899 | B1 | * | 3/2001 | Krebs et al. ............... | 280/731 |
| 6,209,906 | B1 | * | 4/2001 | DeWitt .................... | 280/728.3 |
| 6,338,499 | B2 | * | 1/2002 | Ueno et al. ................. | 280/732 |

* cited by examiner

*Primary Examiner*—David R. Dunn
(74) *Attorney, Agent, or Firm*—Greenblum & Bernstein, P.L.C.

(57) ABSTRACT

The present invention provides an air bag assembly for installing a housing equipped with an inflator in the crush pad of the passenger seat and exposing an air bag door, which includes an upper housing coupled to the upper surface of the housing and has a penetrated hole in the center of the lower surface and a plurality of fixed holes in both upright surfaces. The air bag also includes a retainer, whose refracted part is coupled to the inside of the side surface of the upper housing, which is separated at a predetermined interval as much as the width of the refracted part to make a space from the side surface, a locking part which is created as a form of wedge in the inserting part of the lower surface of an air bag door to be inserted into the fixed hole by being inserted into the upper housing and the space of the retainer.

2 Claims, 4 Drawing Sheets

[FIG. 1]
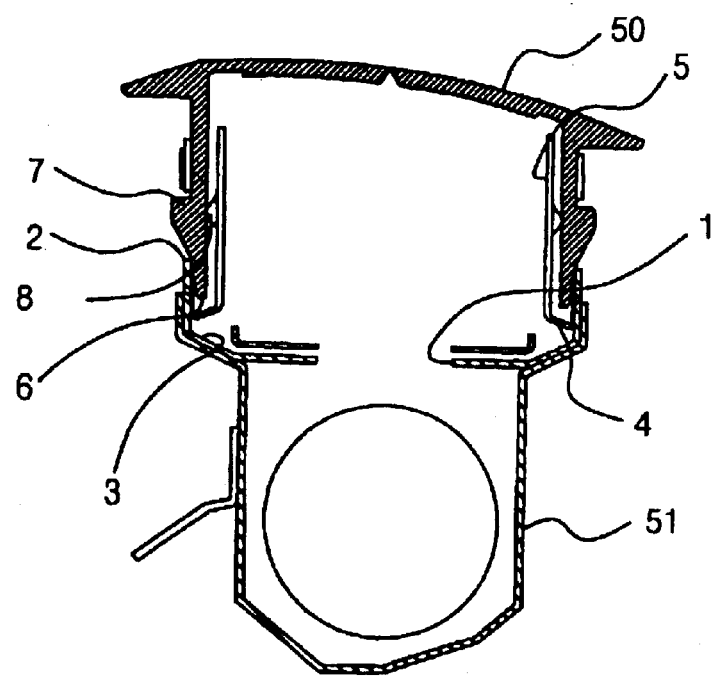

[FIG. 2]
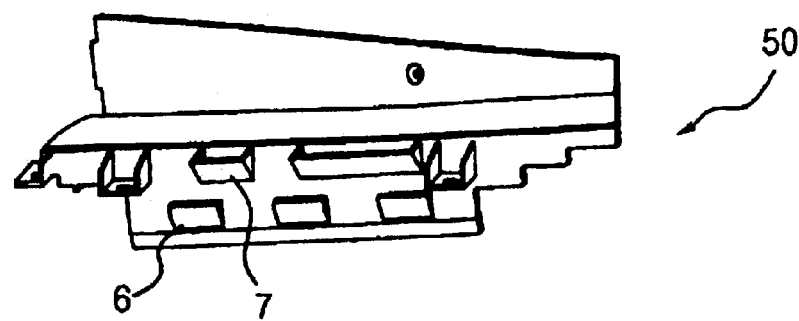
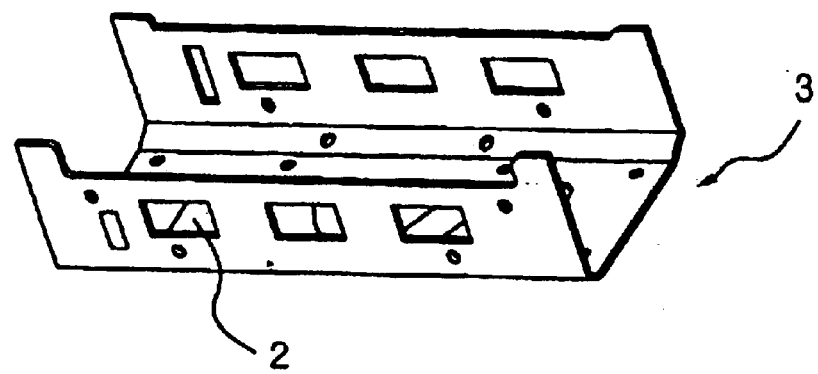
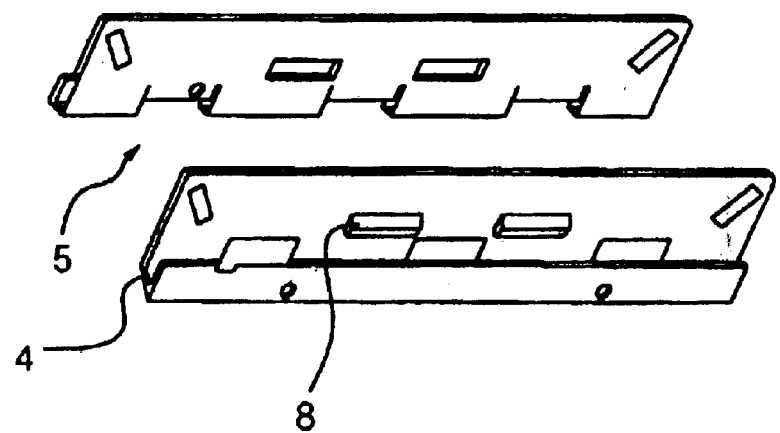

[FIG. 3]
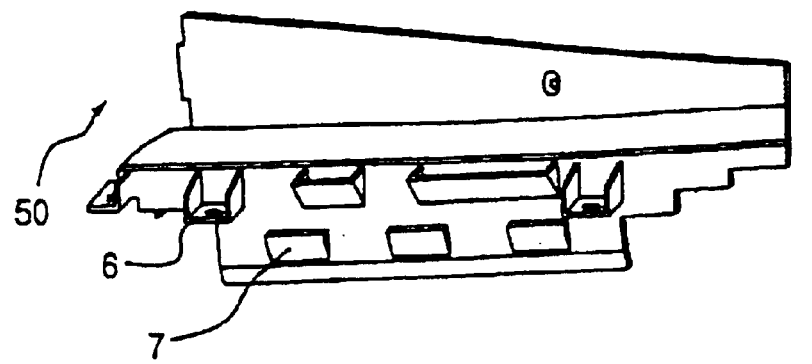
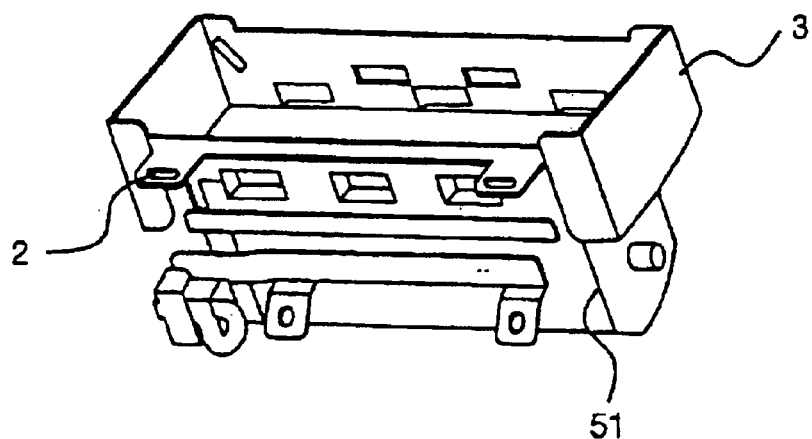
[FIG. 4]
Prior Art
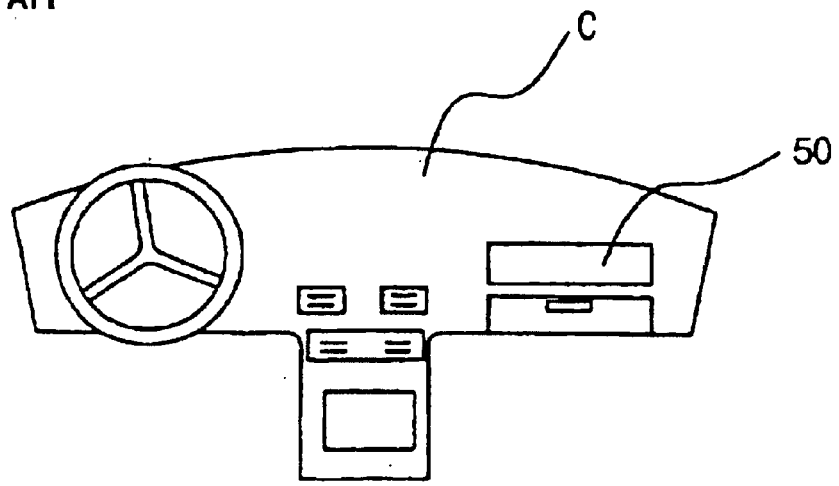

[FIG. 5]
Prior Art
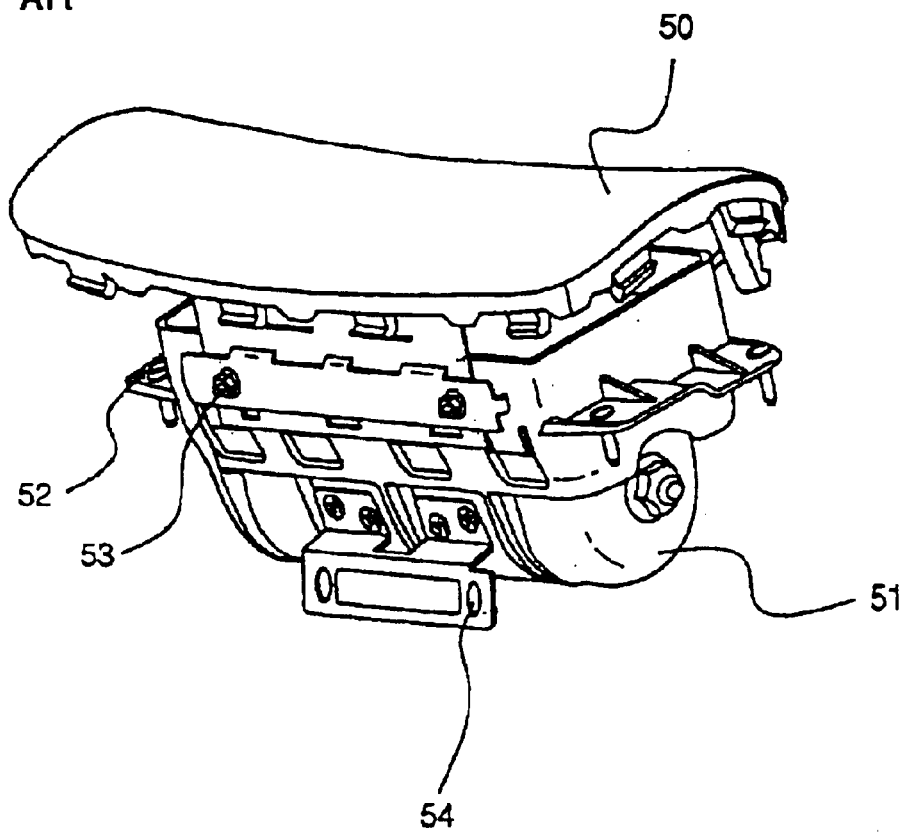

PASSENGER AIR BAG ASSEMBLY WITHOUT DOOR ATTACHMENT BRACKET FOR AUTOMOBILE

BACKGROUND OF THE INVENTION

1. Field of the Invention

The present invention relates to a passenger air bag without door attachment bracket for an automobile, more particularly to a passenger air bag assembly for an automobile to fix an air bag door and a housing with ease and simplify its structure in accordance with its fixing, and thereof, reduce the weight and cost of an air bag assembly.

2. Description of the Related Art

In general, an automobile is equipped with driver and passenger air bags for passengers' safety during an automobile collision.

The air bag as described in the above includes a sensor for sensing an automobile collision, an inflator for being exploded with a signal from the sensor and charging gas into the bag, a housing assembly equipped with the inflator and the bag, and a control unit for controlling the sensor and the inflator.

When a collision value over predetermined values is applied to the control unit from the sensor, the control unit explodes the inflator, and the compressed air generating with explosion in the inflator is charged into the bag to puff an air bag out.

When the air bag is installed in the passenger seat, it is placed in the passenger seat of a crush pad C as illustrated in FIG. 4. Thus, the air bag is expanded to protect a person in the passenger seat during an automobile collision.

The housing assembly installed in the passenger seat includes a housing, which accepts the inflator and a bag and an air bag door 50, which is coupled to the housing and exposed to the crush pad.

In other words, as illustrated in FIG. 5, it includes the inflator, the housing 51 which has a bag (not illustrated), an air bag door 50 which is positioned in the upper surface of the housing 51 and which is opened when the bag expands, the coupled portion 52 which is downward extended on both sides of the air bag door 50, and a reinforced plate 54 made of metal which is positioned in the upper surface of the coupled portion 52 and reinforces its strength when coupling the coupled portion 52 and the housing 51 with bolts 53.

That is to say, it is assembled to have the air bag door 50 positioned in the upper surface of the housing 51 by accepting the inflator and the bag to the housing 51 and adhering the reinforced plate 54 closely to the outside surface of the coupled portion 52 of the air bag door 50 and coupling it with the bolts 53.

However, when adhering the housing and the air bag door closely to their upper and lower surfaces to adhere the reinforced plate to the side and fix the reinforced plate, the coupled portion of the air bag door and the housing with bolts, it makes it very difficult to fix the air bag assembly.

In addition, when fixing an additional reinforced plate, which is metal as illustrated in the above, it makes the whole weight of the air bag assembly increase.

SUMMARY OF THE INVENTION

To solve the above-indicated problems, it is, therefore, an object of the present invention to maintain the strength followed by the fixation of a housing and a door of the air bag by not increasing the whole weight of an air bag assembly and to provide an air bag assembly for a vehicle whose fixation structure is simplified.

To achieve the above object, there is provided an air bag assembly for installing a housing equipped with an inflator in the crush pad of the passenger seat and exposing an air bag door, which includes an upper housing which is coupled to the upper surface of the housing and has a penetrated hole in the center of the lower surface and a plurality of fixed holes in both upright surfaces; a retainer whose refracted part is coupled to the inside of the side surface of the upper housing and which is separated at a predetermined interval as much as the width of the refracted part to make a space from the side surface; a locking part which is created as a form of wedge in the inserting part of the lower surface of an air bag door to be inserted into the fixed hole by being inserted into the upper housing and the space of the retainer.

BRIEF DESCRIPTION OF THE DRAWINGS

The above objects, features and advantages of the present invention will become more apparent from the following detailed description when taken in conjunction with the accompanying drawings, in which:

FIG. 1 is a cross-sectional view illustrating an air bag assembly for a vehicle in accordance with the present invention.

FIG. 2 is a disassembled perspective view of FIG. 1.

FIG. 3 is an assembled perspective view of FIG. 2.

FIG. 4 is a sketch illustrating the state of an air bag installed in the passenger seat of a vehicle.

FIG. 5 is a perspective view illustrating an air bag to be installed in the passenger seat shown in FIG. 4.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIGS. 1 and 2 are a cross-sectional view and a disassembled perspective view illustrating an air bag assembly for a vehicle in accordance with the present invention, which include an upper housing 3 which is coupled to the upper surface of the housing 51 and has a penetrated hole 1 in the center of the lower surface and a plurality of fixed holes 2 in both upright surfaces; a retainer 5 whose refracted part 4 is coupled to the inside of the side surface of the upper housing 3 and which is separated at a predetermined interval as much as the width of the refracted part 4 to make a space from the side surface; an inserting part 6 formed in the lower surface of the air bag door 50 to be inserted between the upper housing 3 and the retainer 5; a locking part 7 which is created as a form of wedge in the fixed hole 2 by being formed as protruded in the inserting part 6.

In addition, when the inserting part 6 is inserted into the space of the retainer 5, a pressure asperity 8 is created in the triangle form to fix the inserting part 6 firmly to the fixed hole 2.

In other words, when the locking part 7 created in the inserting part 6 is inserted into the fixed hole 2 and will not come out, the pressure asperity 8 of the retainer 5 pushes the inserting part 6 to the side of the fixed hole 2, so the lower surface of the retainer 5 is fixed to the upper housing 3 and the upper surface of the retainer is free, fixed to nothing, which makes the retainer 5 have elasticity itself and push the inserting part 6.

The penetrated hole 1 is made to connect the inflator and the bag. Both housing 51 and upper housing 3 and both upper housing 3 and retainer 5 are connected by welding together.

The upper housing 3 and the retainer 5 include a plurality of penetration parts to minimize their weight while maintaining their strength.

As far as the effect of the present invention as described in the above is concerned, the upper housing 3 is coupled to the upper surface of the housing 51 by using the same method of the welding before a worker mounts the housing 51 to the crush pad C.

When the upper housing 3 is coupled to the upper surface of the housing 51, two retainers 5 are fixed to the inside of both sides of the upper housing 3 by welding or riveting rivet.

At this moment, the refracted part 4 of the retainer 5 is coupled to the inner surface of the upper housing 3, and the inner surface of the upper housing 3 and the retainer 5 are separated at a predetermined interval as much the refracted width of the refracted part 4 to make a space.

When the retainer 5 is fixed by making a space from the inner surface of the upper housing 3, the inserting part 6 of an air bag door 50 is inserted into the space as illustrated in FIG. 3 and at the same time the locking part 7 is locked to the fixed hole 2 of the upper housing 3.

As a result, as the locking part 7 is created as a form of wedge in inserting the inserting part 6 as described in the above, the upper housing 3 is a little bit expanded and inserted easily into the locking part 7.

When the locking part 7 is locked to the fixed hole 2, the air bag door 50 is made fixed, which substantially completes an air bag assembly. As a result, the pressure asperity 8 of the retainer 5 pushes the backside of the inserting part 6 to the direction of the housing 3 and thereof, the locking part 7 is more firmly inserted into the fixed hole.

When arranging them as described in the above, it is more convenient to assemble them than to assemble them with traditional bolts or reinforced plates.

In addition, it is possible to assemble the air bag assembly without additional metal parts such as traditional reinforced plates or bolts, which contributes to reduce the whole weight greatly.

The air bag assembly is installed in the crush pad C when its assembly is completed. Accordingly, when the air bag explodes during an automobile collision, a cutting part (not illustrated) of the air bag door 50 gets open to expand the bag to reduce the injury of a person in the passenger seat.

At this moment, the air bag door 50 is fixed by the locking part 7 and the fixed hole 2, and thereby, only the bag pops out.

As described in the above, the present invention includes an air bag assembly with a retainer, an upper housing and a locking part of an air bag door. Accordingly, it contributes to reduce its weight and cost and simplify its structure when assembling an air bag assembly.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An air bag assembly for installing a housing equipped with an inflator in a crush pad of a passenger seat and exposing an air bag door, comprising:

an upper housing which is coupled to an upper surface of the housing, said upper housing having a penetrated hole in the center of a lower surface thereof, and a plurality of fixed holes in upright side surfaces thereof;

a retainer having a refracted part which is coupled to the inside of a side surface of said upper housing, and which is separated at a predetermined interval as much as the width of the refracted part to make a space from the side surface; and a locking part which is in the form of a wedge provided on an inserting part of a lower surface of an air bag door, said locking part configured to be inserted into the fixed hole of said upper housing when the inserting part is inserted into said upper housing and the space of said retainer.

2. The air bag assembly according to claim 1, wherein when the inserting part is inserted into the space of said retainer, a pressure asperity provided on said retainer pushes on a backside of the inserting part in such a manner that said locking part is firmly engaged in the fixed hole.

\* \* \* \* \*